April 22, 1969 J. F. SHERLOCK ET AL 3,440,624

MAGNETIC CORE MATRIX DATA STORAGE DEVICES

Filed Oct. 26, 1964 Sheet 1 of 9

INVENTORS
JAMES FRANCIS SHERLOCK
KENNETH FORBES RANKIN
BY [signature]
ATTY.

INVENTORS
JAMES FRANCIS SHERLOCK
KENNETH FORBES RANKIN
BY Irvin S. Thompson
ATTY.

INVENTORS
JAMES FRANCIS SHERLOCK
KENNETH FORBES RANKIN
BY Irwin S. Thompson
ATTY.

MAGNETIC CORE MATRIX DATA STORAGE DEVICES

INVENTORS
JAMES FRANCIS SHERLOCK
KENNETH FORBES RANKIN
BY Irwin S. Thompson
ATTY.

INVENTORS
JAMES FRANCIS SHERLOCK
KENNETH FORBES RANKIN
BY
Irvin A. Thompson
ATTY.

INVENTORS
JAMES FRANCIS SHERLOCK
KENNETH FORBES RANKIN
BY
ATTY.

INVENTORS
JAMES FRANCIS SHERLOCK
KENNETH FORBES RANKIN
BY
Irvin S. Thompson
ATTY.

INVENTORS
JAMES FRANCIS SHERLOCK
KENNETH FORBES RANKIN
BY
Irwin S. Thompson
ATTY.

INVENTORS
JAMES FRANCIS SHERLOCK
KENNETH FORBES RANKIN.
BY
ATTY.

United States Patent Office 3,440,624
Patented Apr. 22, 1969

3,440,624
MAGNETIC CORE MATRIX DATA STORAGE DEVICES

James F. Sherlock, Malvern, and Kenneth Forbes Rankin, Liverpool, England, assignors to Automatic Telephone & Electric Company Limited, Liverpool, England, a British company Filed Oct. 26, 1964, Ser. No. 406,235
Int. Cl. G11b *5/06;* G06f *11/04*
U.S. Cl. 340—174 3 Claims

ABSTRACT OF THE DISCLOSURE

A magnetic core matrix storage device includes X and Y primary and secondary selectors for core selection by coincident current single wire working. The method of operation is asynchronous, the completion of one step initiating the start of the next and delay lines are included for timing certain of the steps. Selection of a core is effected by applying binary signals to input leads to activate toggle circuits and checking means are provided for checking the correct setting of the toggle circuits. The setting of the toggle circuits is converted by binary to linear conversion circuits, each of which activates one of a plurality of outlet leads according to the activation of the toggle circuits. Further checking arrangements are provided for ensuring that one only of the outlet leads of each binary to linear converted is activated. Four binary to linear converters are provided and the activation of one outlet lead of a first converter selects an X primary selector, of a second converter selects an X secondary selector, of a third converter selects a Y primary selector and of a fourth converter selects a Y secondary selector, thereby defining a particular core of the matrix. Arrangements are described for reading from and rewriting into and for writing into the storage device.

The present invention relates to magnetic core matrix data storage devices, for use for example, in electronic computers or data processing arrangements.

Such storage devices provide a convenient method of storing large quantities of data in a small space, and the data thus stored is readily accessible using selecting arrangements well known in the art.

However, in large parallel-operated data processing systems, it is important for high speed operation that the cycle time of the associated storage device should be as short as possible and accordingly that the system should be asynchronous.

It is, therefore, the object of the invention to provide such a storage device of the magnetic core matrix type.

According to the invention, in a magnetic core matrix data storage device, subsequent to the operation of address selection which is initiated by external equipment, means for effecting the operations involved in reading, in reading and rewriting or in reading and writing become operative sequentially, the completion of one operation serving to initiate the start of the next operation and arrangements are provided within the device for exerting a timing control on certain of the individual operations.

According to one aspect of the invention, in a magnetic core matrix data storage device, subsequent to the operation of address selection which is initiated by external equipment, means for effecting the operations involved in reading, in reading and rewriting and in reading and writing become operative sequentially, the completion of one operation serving to initiate the start of the next operation, certain of the operations involving arrangements for checking the accuracy of the operation and the initiation of the start of a succeeding operation is effected only if the checking arrangements indicate that the previous operation was accurate.

Figure 1:
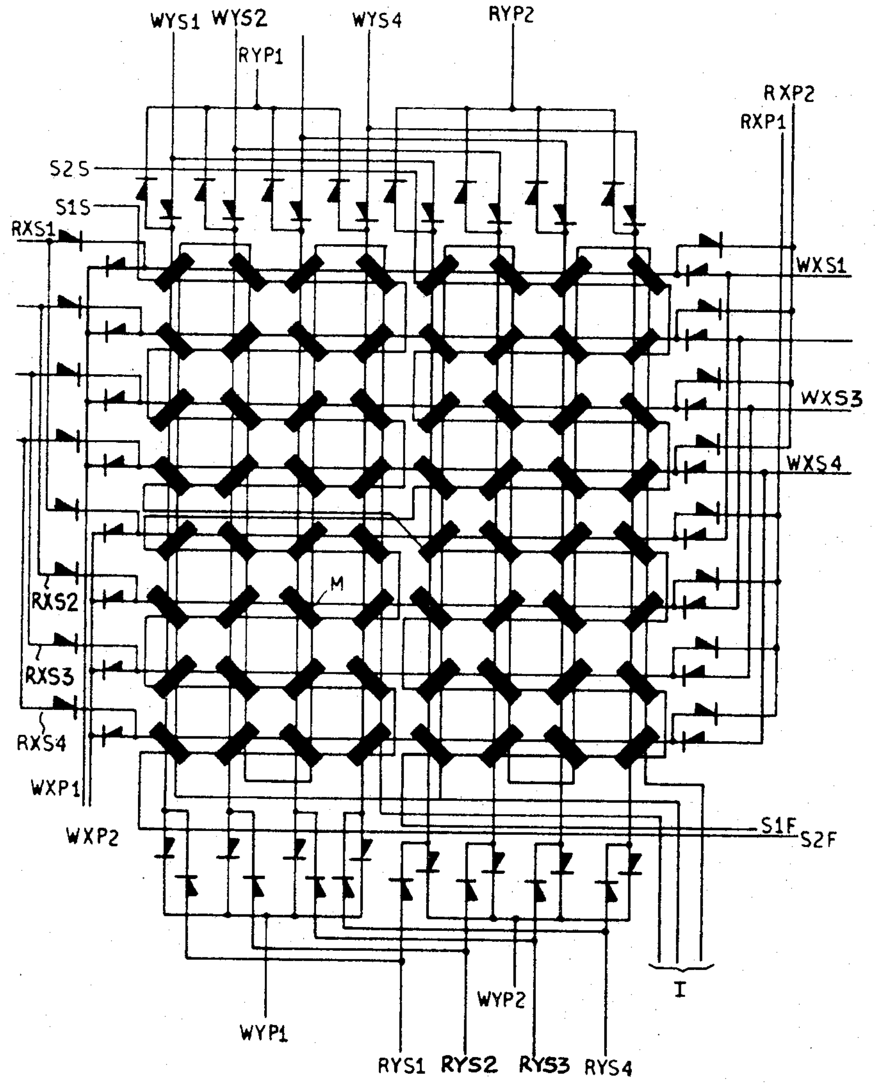
Figure 2:
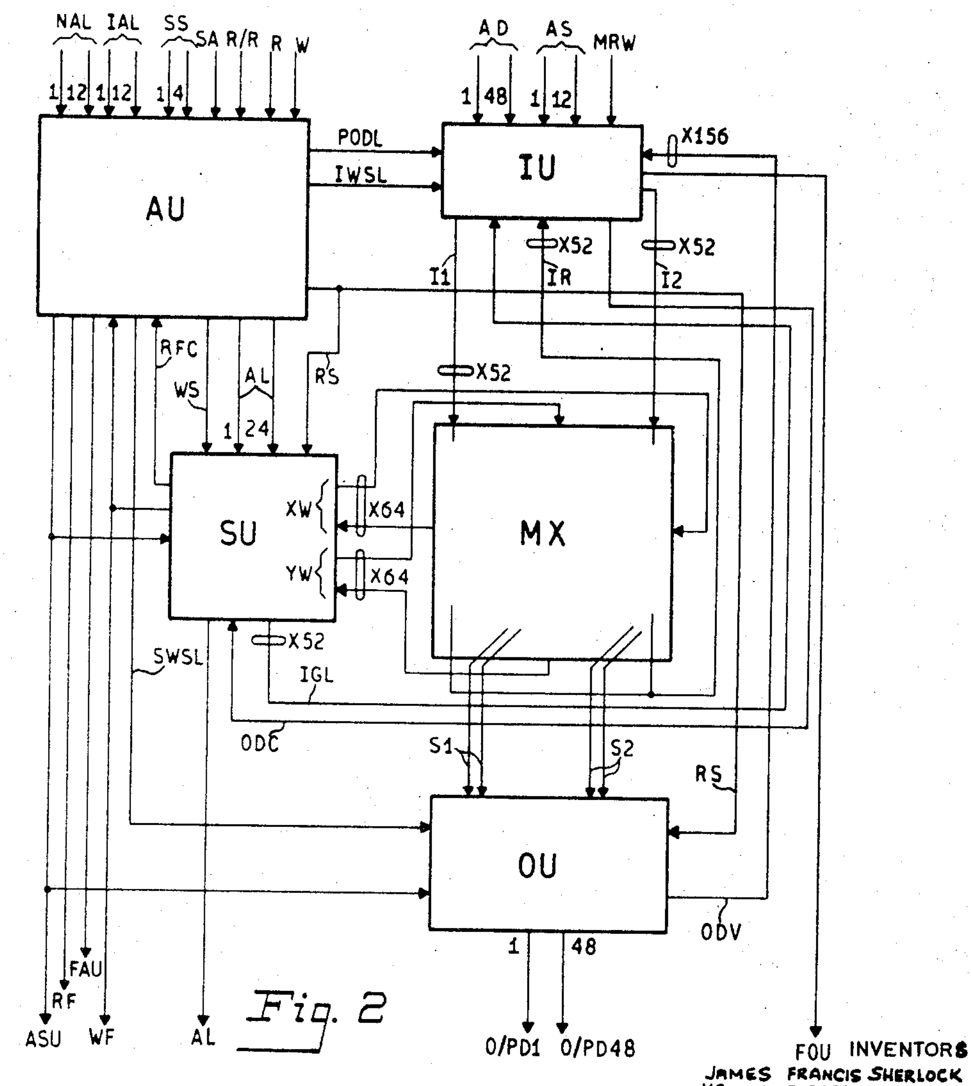
Figures 3, 4:
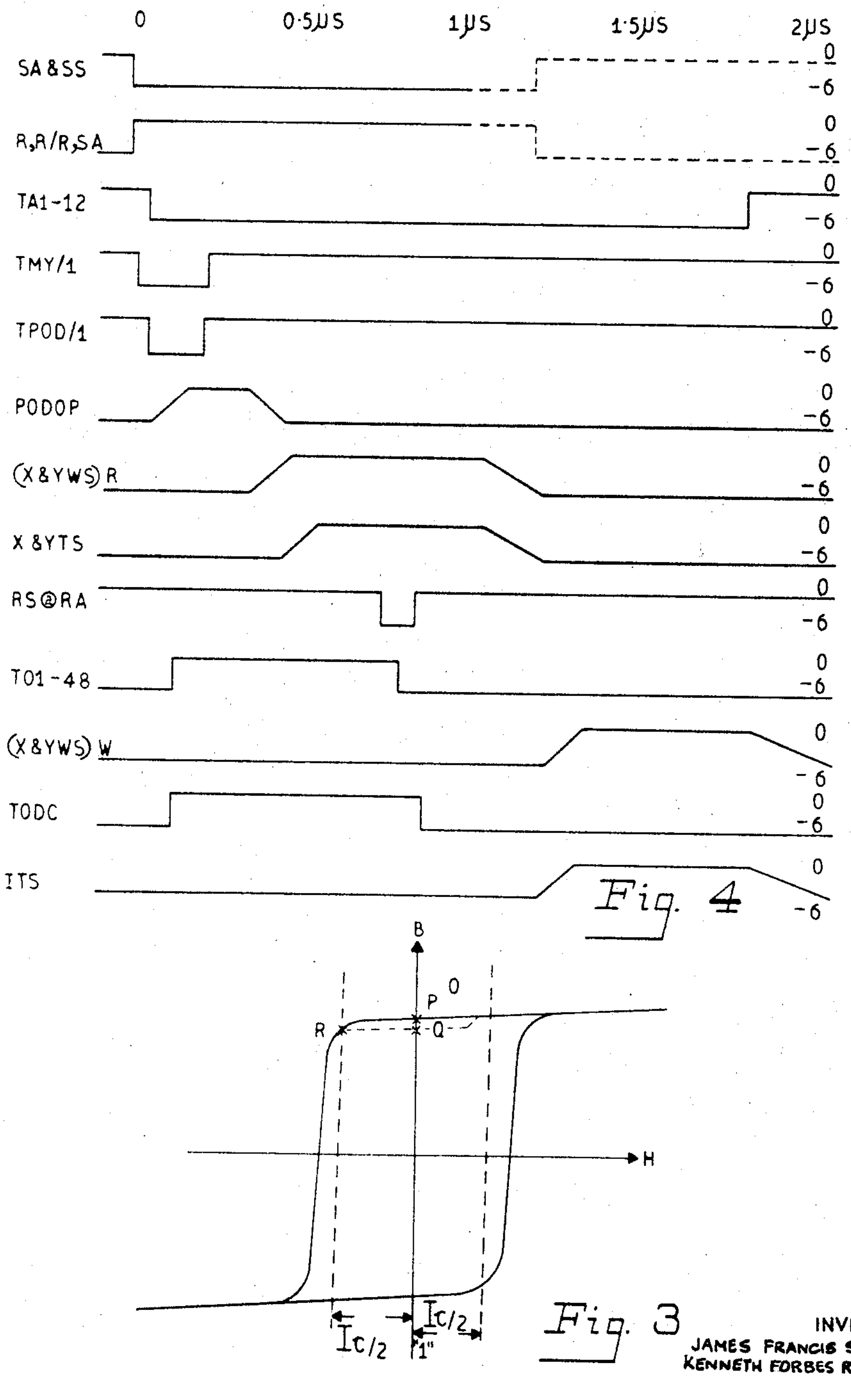
Figure 9:
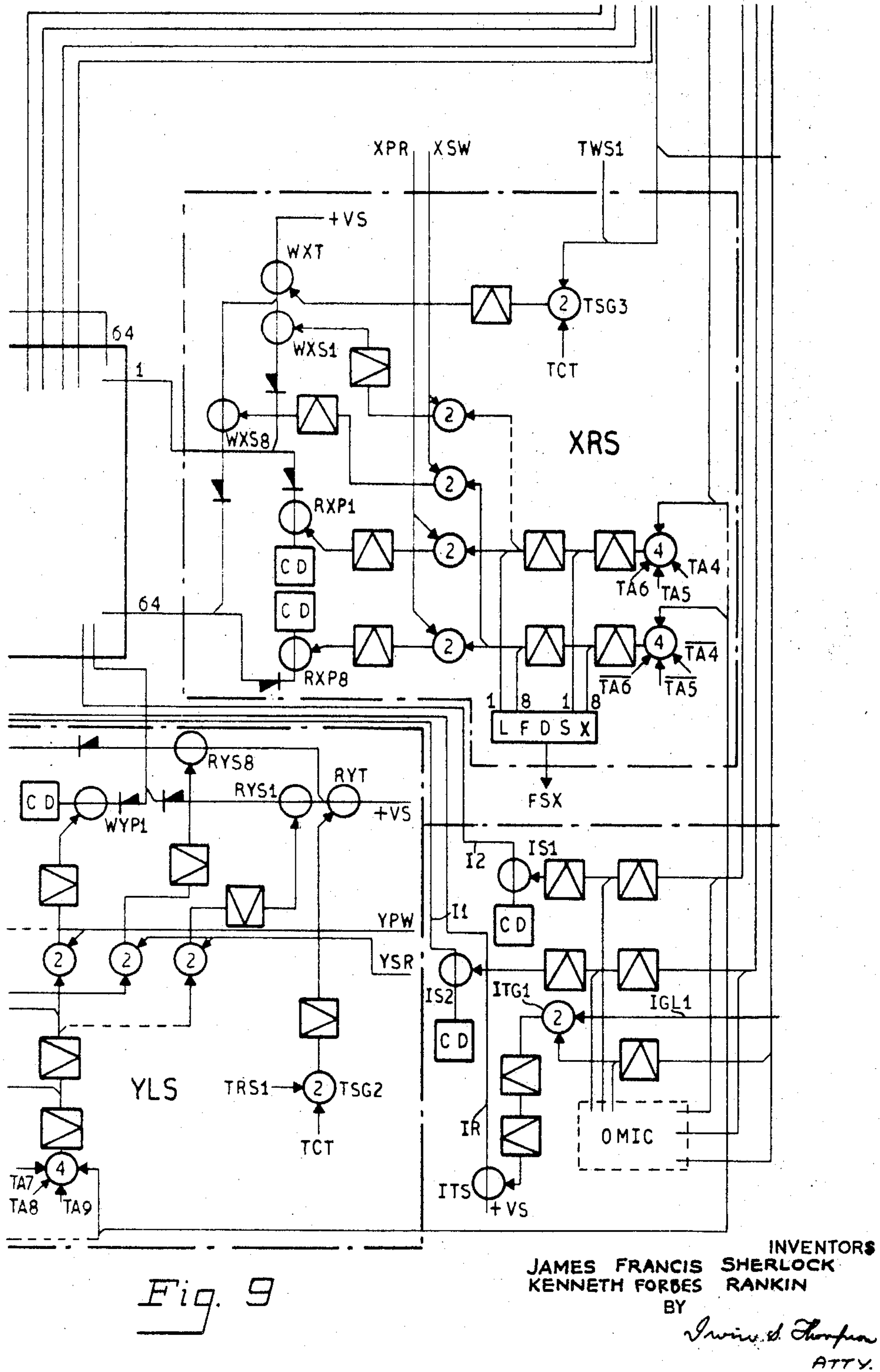
Figure 10:
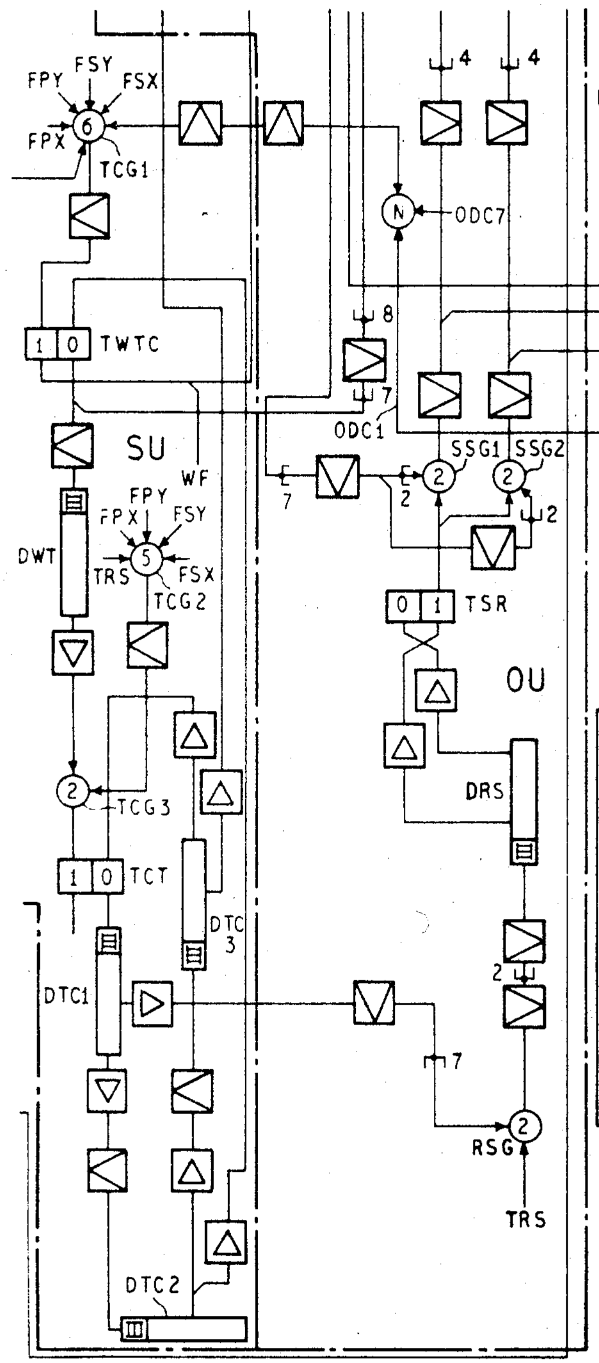
Figure 11:
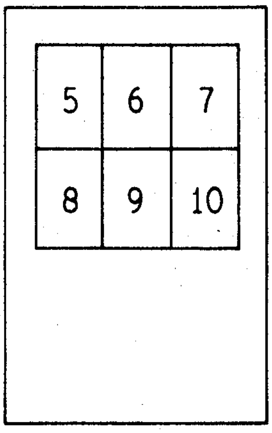

The invention will be more readily understood from the following description which should be read in conjunction with the accompanying drawings. Of the drawings:

FIG. 1 shows an arrangement of magnetic cores and the associated wiring for a matrix plane for use in the invention, FIG. 2 shows a block diagram of the control equipment according to the invention, FIG. 3 shows a hysteresis loop for a magnetic core, FIG. 4 shows a timing diagram for the control equipment and FIGS. 5–10, which should be arranged as indicated in FIG. 11, show the detailed logical diagram for the control equipment shown in FIG. 2.

The wiring of each matrix plane will initially be described with reference to FIG. 1. FIG. 1 shows an 8 x 8 plane of magnetic cores which are selected on the coincident current principle. According to this principle, coincidence between $a+Ic/2$ row current and $a+Ic/2$ column current in one core causes this core to assume the "1" condition, and coincidence between corresponding negative currents will cause it to assume the "0" condition. Thus it will be appreciated that the same row and column wires may be employed for both reading and writing by generating half current reading pulses of opposite polarity to the half current pulses for writing.

This mode of core selection is referred to as single wire working and may be performed by passing the half current pulses in opposite directions for the two operations. When it is required to write into a core, this core is selected by firstly priming the required "write Y primary selector" and the required "write Y secondary selector" to define the required column wire and by secondly priming the required "write X primary selector" and the required "write X secondary selector" to define the required row wire. In FIG. 1 a magnetic core "M" is shown and this core would be selected on a "write cycle" by operating write Y primary selector WYP1 and write Y secondary selector WYS3 to define the column wire and by operating write X primary selector WXP2 and write X secondary WXS2. These selectors may conveniently be transistor switching circuits of the type shown in United States Patent No. 3,343,147 granted Sept. 19, 1967 to J. Ashwell. Such circuits are arranged to pass a current pulse which, as far as electron current flow is concerned, is generated in a current defining circuit associated with the primary selectors. Thus conventional current flow in the write mode flows from bottom to top (column wire) and from left to right (row wire) in FIG. 1.

The conventional mode of wiring is employed i.e., the coincidence of two half current pulses cause a core to be changed to the "1" state and this condition is inhibited by the application of a half current pulse on the inhibit wire in opposition to the half current pulse on the column wire. The inhibit wire, sometimes called the digit wire, is divided, however, into two separate wires each passing through half the total number of cores per plane in the matrix plane shown in FIG. 1. This allows selection of either half of each plane in the matrix and is of particular use in preventing false setting of partially selected cores and, due to the halved back E.M.F. experienced, allows less sensitive driving circuits to be used. The mechanism required to select the required inhibit wire for each matrix will be described later.

It has been mentioned previously that the matrix of the invention is of the so-called single wire type. Therefore the same row and column conductors are employed for selecting the required core in each plane when a reading operation is required. In this case if core M is again the required core "read Y primary selector" RYP1 is operated together with "read Y secondary selector" RYS3 to define the column wire and "read X primary selector" RXP1 together with "read X secondary selector" RXS2 is operated to define the required row wire. The read selectors are of similar configuration to those employed as write selectors so that in the reading case conventional current flow is from top to bottom for the column wires and from right to left for the row wires in FIG. 1. Thus when reading is performed the current pulses are effectively $-Ic/2$, if the writing pulses are assumed to be $+Ic/2$, and all the selected cores on each plane in the store are urged towards the "0" state.

When reading takes place it is found, in conventional magnetic core matrix planes, that spurious signals, due to the disturbance of cores which are partially selected, are experienced on the sense wire. The usual method of overcoming this difficulty is to arrange for the sense wire to pass through half the magnetic core elements in one electrical sense and through the other half of the core elements in the opposite sense. This gives a partial cancellation but is complex to fabricate. The sense wire in the matrix shown in FIG. 1 is split into two separate sections one wire being S1S and S1F and the other being S2S and S2F. Each wire, S1 and S2, accommodates half the plane, however, the wire is threaded parallel to the X drive wires and threads two diagonally opposite quarters of the plane in series. As was mentioned previously the invention includes arrangements for selecting one of the two inhibit wires and, therefore, half the plane. These arrangements may be employed when a reading operation is required to effect one of four (either half of the sense wires) sections of the plane. This mode of sense wire control substantially reduces the effect of spurious signals as only six cores in each sense wire section are disturbed when electing a particular core in the matrix plane shown in FIG. 1 whereas if conventional methods of sense wiring were employed a total of fourteen cores would be disturbed.

It will be noticed that a multiplicity of diodes are provided for isolation purposes associated with each primary and secondary selector in both the reading and writing circuits.

The magnetic core storage matrix now to be described employs magnetic core planes each of a similar configuration to that discussed above, the device being arranged to store 2096 words of 48 bits each. Each plane consists of a 64 x 64 array of magnetic cores and 52 planes (48 plus 4 spare) are employed to complete the martix. The matrix is divided into two stacks of twenty-six planes each. These two stacks are driven in parallel by the selectors. Each plane is divided into sections of eight for the primary selectors so that eight write primary selectors are provided for the column selection together with eight secondary selectors and similar numbers for row selection and column and row selection for reading. One timing selectir for reading and one for writing is associated with all the secondary selectors for the columns or rows, thus giving a total of four timing selectors for each plane. The inhibit and sense wire pairs are inidivdual to each plane in each stack.

General rescription of store control

Referring now to FIG. 2, which is a block diagram of the equipmpent shown in FIGS. 5–10, a brief outline of the control and operation of the magnetic core store MX will be given. The store is operated and controlled in parallel mode using D.C. logic and is intended for use in conjunction with a fully asynchronous parallel computer. The store is "selected" or "seized" by a change of D.C. level on all four leads SS (store selection) simultaneously together with a change in D.C. condition on one of leads SA (set address) and R (read) or R/R (read/write). The latter leads together with lead W (write) are used to define the function required by the controlling computer when the store is selected. The store address selection signals are presented to the address unit AU at the same time as the store signals are presented. The store address selection signals are presented over two sets of twelve separate leads NAL and IAL. The twelve leads NAL carry the required store address in normal binary form (e.g., 0 volts for "0" condition and −6 volts for "1" condition) while the twelve leads IAL carry the inverse of the store address on leads NAL. Thus the D.C. voltage levels on leads IAL will be of the form of 0 volts for a "1" condition and −6 volts for "0" condition. These two sets of address leads are used to set the address toggles in the address unit AU and also to verify that the address toggles are correctly set to the required address. When it has been verified that the address toggles have been set to the correct condition an address set-up condition is produced on lead ASU. This signal is used to indicate to the controlling computer that the store is ready for the required operation, to reset the output data toggles in output unit OU and to gate the selector unit SU address data signals on leads AL.

It is advantageous at this stage to consider the format of the store address received over leads NAL. As mentioned previously there are twelve such leads individually referred to as leads N1 to N12 respectively and the conditions of these leads may conveniently be used to define the X and Y primary and secondary selectors required to select the cores which form the wanted address. The address word may be divided into four three-bit sections as follows:

| LEADS | Section 1 | Section 2 | Section 3 | Section 4 |
|---|---|---|---|---|
| NAL | N1 N2 N3 | N4 N5 N6 | N7 N8 N9 | N10 N11 N12 |
| Selectors | X Left | X Right | Y Lower | Y Upper. |
| READ | X Secondary | X Prim | Y Sec | Y Prim. |
| WRITE | X Prim | X Sec | Y Prim | Y Sec. |

It will be appreciated that the address toggles are permanently storing a particular address as the condition 000 must be used to define a decimal number one when three bits are use in binary code to define up to eight selections.

When the store address is received the most significant bit of section 3 (lead N7), which is the most significant bit of the Y lower selector, is separately stored to select which of the two inhibit wires (I1 or I2) and, therefore, which half of the plane the required function will take effect on. This performed by passing a signal over lead IWSL to the input unit IU inhibit wire selectors. The reception of the function condition, either set address, read or read/rewrite on leads SA, R or R/R respectively, is also used to initiate the production of a preoperate disturb pulse over lead PODL. This preoperate disturb pulse performs the same function as the well known "Post write disturb pulse." The final operation performed by the store will always be a write operation as, if a read operation is required, the original information must be written or amended information must be written into the store because the stored word after reading will be all "0's." When the write or rewrite operation has been completed all the cores threaded by the inhibit wires used for this operation which were pulsed (i.e., on planes which an "0" condition is to be stored) may have entered a minor hysteresis loop. The preoperate disturb pulse, therefore, is used to return these cores to their major hysteresis loop. The effect of the preoperate disturb pulse will be more easily seen with reference to FIG. 3. A core which is storing an "0" will normally be in a condition indicated by point P on the major hysteresis loop. When this core is selected, and it is required to maintain the "0" condition, half current pulses are connected to the X and Y wires threading this core, together with an inhibit pulse in opposition to the Y wire pulse. The total effect of the core will be the half current pulse on the Y wire thus the core will be driven by this half current pulse to point R and will, therefore, return to point Q over a minor hysteresis loop. When the half current preoperate disturb pulse on the inhibit wire occures the core will follow the minor hysteresis loop shown in FIG. 3 returning to the major hysteresis loop. The same operation will be experienced on all cores which are threaded by the previously selected X wires thus ensuring that all cores storing an "0" condition are in a state indicated at point P on the major hysteresis loop shown in FIG. 3. This operation obviously reduces "delta" noise thereby allowing a greater margin of read pulse detection.

With reference once again to FIG. 2, the operation required, i.e., read, write and so on, is used to open the required primary selector decoder gates and this gating signal is presented to the selector units SU over either lead RS (read select) or lead WS (write select). The signal on lead RS or lead WS is gated with signals from linear fault detector circuits, which are associated with each decoder selection gate in the selector unit SU, to initiate the timing control sequence for the core selection operations. It will be noted that this stage in this operation of the control equipment is the first time any reference has been made to timing. So far the operation of the system has been fully asynchronous.

On the completion of the preoperate disturb pulse, which is of a controlled duration, the X and Y wire primary and secondary selectors are operated assuming a read operation is required. The operation of these selectors is fully asynchronous, however, the routing of the half current pulses for selection is performed under the control of a timing selector which is operated by the timing control circuit in the selector units SU. When these timing selector units are operated, the required core on each plane is selected and driven, if storing a "1," into the "0" condition. Outputs will be experienced on all the selected sense wires (the required sense wires being defined by the condition of lead SWSL according to the state of the most significant X and Y selector code bits) which thread cores which change their state (i.e., from "1" to "0") and these output conditions are presented to strobed read amplifiers, fifty-two in all, one for each plane in the stack, which control the setting of the fifty-two output toggles in the output unit OU. The read data word is fed over leads O/PD1–OPD48 (i.e., a 48 bit output word) to the controlling computer. Various check signals are also fed to the input unit at this time over leads ODV (52 sets of three) to cause the rewriting operation to be performed if the output toggles have been correctly set.

The rewrite operation is initiated by a "read finish" signal which is generated by a read finish toggle in the address unit AU. This read finish toggle is set by an output from the timing control circuit in the selector unit over lead RFC. The operation of the read finish toggle causes a signal on lead RF (read finish lead) to be sent to the controlling computer and also causes the operation of the write control circuit in the address unit for the control of the eventual rewrite operation. In the case of a read only signal to the store initially the read finish signal is produced but the write control circuit is not operated.

The rewrite cycle is allowed to continue only if the output corresponds to the data read from the store, and this fact is indicated to the timing circuit in the selector unit SU over lead ODC. If a fault is sensed, e.g., a toggle has to be left reset when a "1" condition was read from store, a fault signal is produced on lead FOU and the timing control circuit in the selector unit SU is reset.

Before giving an outline of the rewrite operation it is advantageous to show, at this point, the operation of the store if a write operation is required as the two operations are similar.

When a write operation is required initially, a set address signal is produced causing the required store address to be staticised and checked as described for the reading operation. A write cycle is always preceeded by a read cycle to ensure that all the cores are in a "0" condition and therefore a "1" condition can not be erroneously recorded. When the "write" signal is generated by the controlling computer, which may be in response to the reception of the read finish on lead RF, a signal is produced by the address unit over lead WS to the selector unit SU. This is used to gate the address data leads AL to the required primary and secondary selectors and to start the timing control system. At this time the amend-data will be presented to the store over leads AD1–48. This input amend data is divided into four-bit subsections, twelve subsections in all, and provision is made for using all the input amend data or just certain subsections. The subsections requiring amendment are indicated by the condition of leads AS1–12 (one for each subsection). Any subsections which do not require modification will simply have the original stored data rewritten into them. A merging facility for 0's is also provided and this is achieved by signals on lead MRW.

The operation of the control equipment is the same as described above for a reading operation until the operation of the selectors. The operations of the X and Y primary and secondary write selectors is obviously at a later time, controlled by the timing control circuit in the selector unit SU, and corresponds to the earliest time available after the read-cycle is complete.

The amend data input lead conditon or the output toggle conditions are gated by the timing control to drive the inhibit wire timing selectors if it is required to store a "0" condition at the same time as the timing selectors for the X and Y wire primary and secondary selectors over leads IGL. Which of the two inhibit wires I1 or I2 is defined as stated above from the most significant bit of the Y selector's code in the required store address code stored in the address unit.

On the completion of the write operation the timing control circuit signals, over lead WF, to the controlling computer and to the address unit AU to reset the address toggles and the various operation control circuits. The store is now ready for future use.

The detailed operation of the store control

With reference now to FIGS. 5–10 the detailed logical operation of the various units shown in FIG. 2 will be presented showing that the access cycle time is 2 $\mu$seconds. FIGS. 5–10, showing the logical circuits for the units of FIG. 2, should be placed side-by-side in accordance with FIG. 11.

The following description will be sectionalised under convenient headings commencing with the operation of the address unit AU which deals with the reception, checking and distribution of the store address word. Throughout the following description reference will be made to certain voltage levels and these levels, which are intended to be in no way limiting to the description, may conveniently be defined as 0 volts indicating a "0" condition and −6 volts with respect to 0 volts indicating a "1" condition. The operation leads, however, are assumed to correspond to the following: 0 volts indicating a selected condition and −6 volts a nonselected condition. All toggles shown in FIGS. 5–10 conform to the convention that they are "set" on a positive-going input edge, and the "set" output from the "1" side is −6 volts. All the gates shown are negative AND gates, however, in certain cases these gates are operated as positive OR gates. All gates marked with an asterisk (*) are AND gates having an output diode which may be used to form one input of a negative OR gate. All other gates are formed simply by connecting the anodes of separate diodes to the input leads and commoning together all the cathodes of these diodes to form the output point and these gates may be referred to as "clamping" gates. The output amplifiers shown associated with the delay lines are two stage devices with overall signal inversion.

Figure 5:
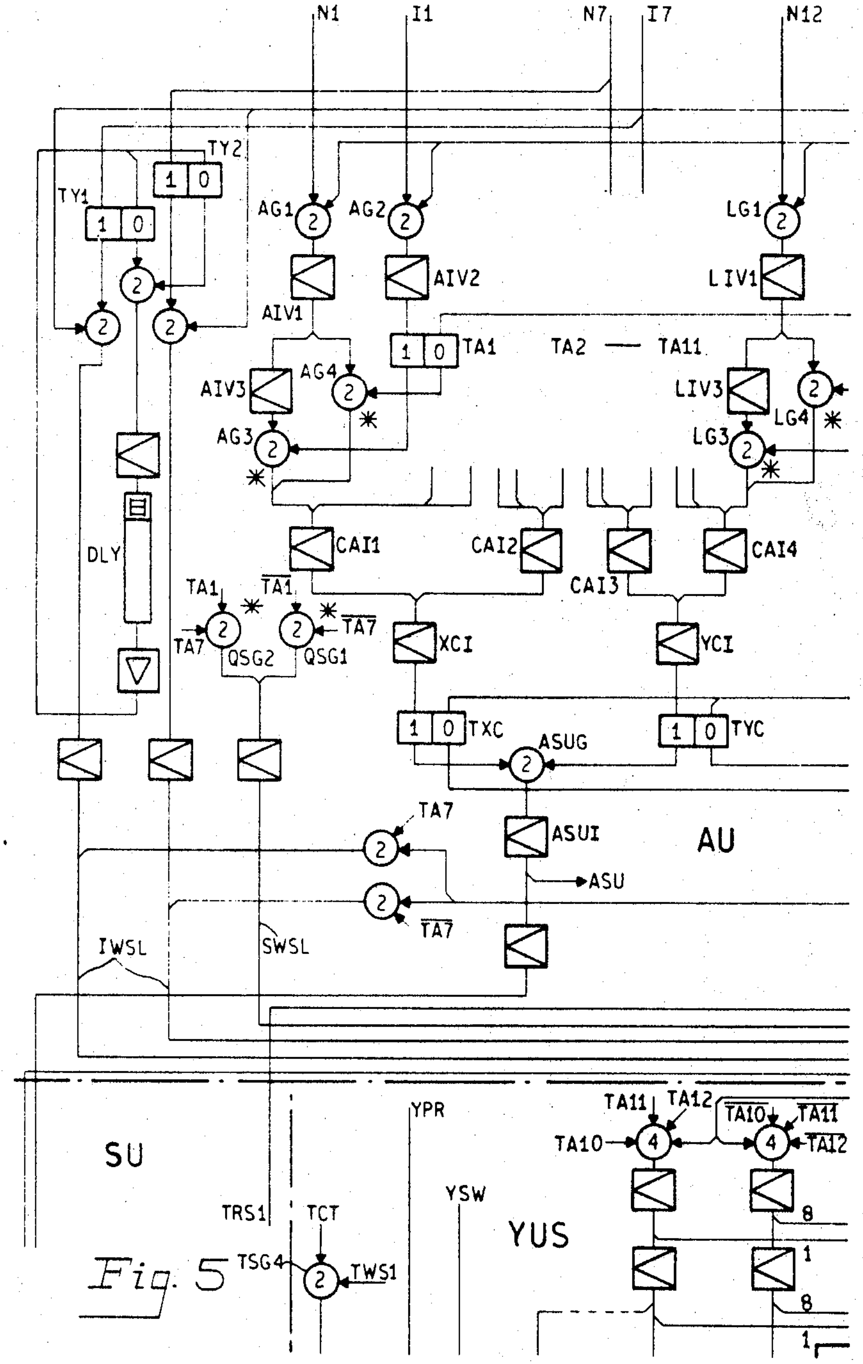
Figure 6:
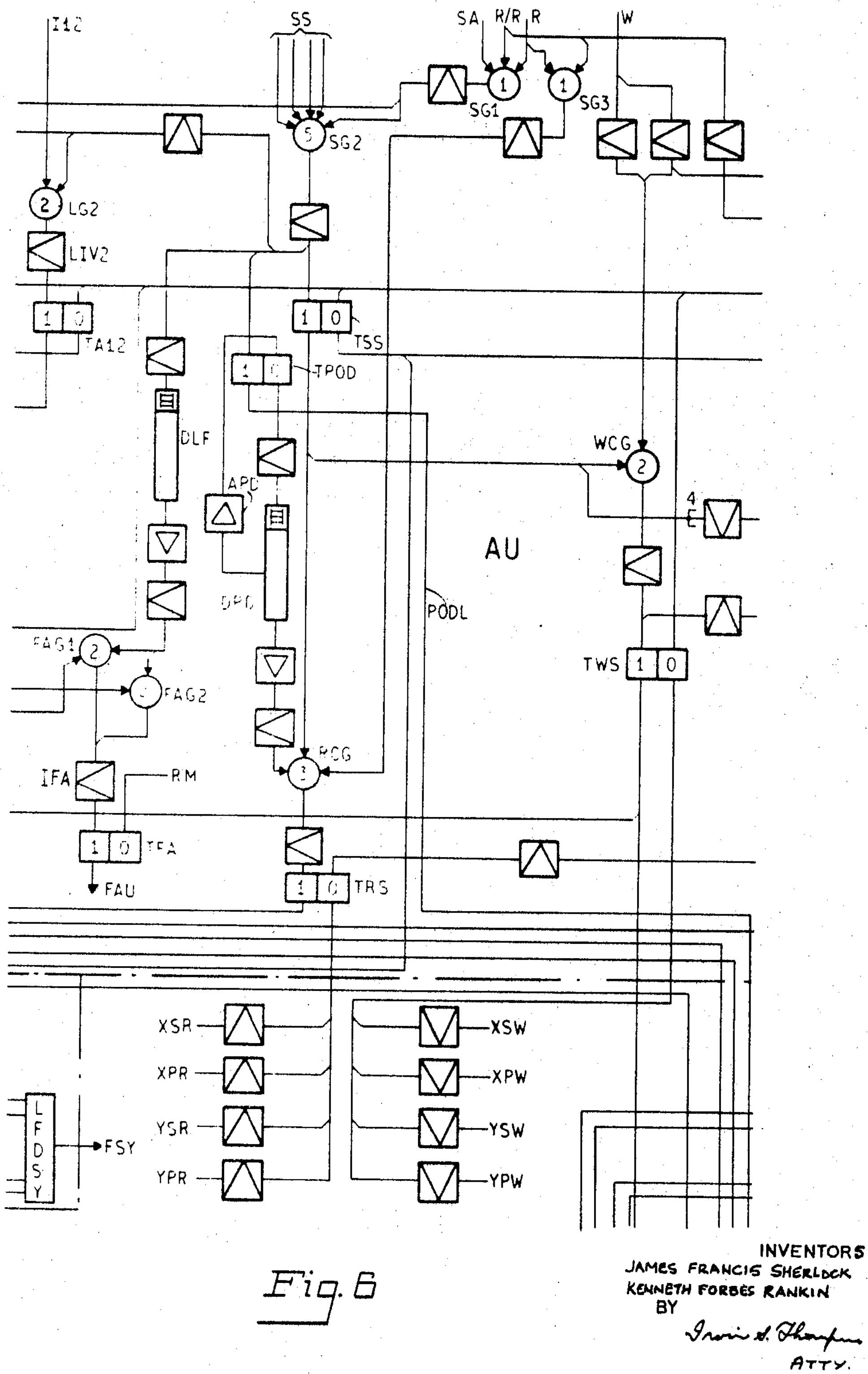

When the store is taken into use one of the store operation control leads SA, R/R or R will be chosen by the controlling computer. Gate SG1 in FIG. 6, is operated as a positive OR gate and therefore produces a positive output in response to a change in voltage from −6 volts (the non-selected condition) to 0 volts on one of leads SA, R/R or R. The output of gate SG1 is inverted and applied to negative AND gate SG2 together with the four store selection leads SS. A negative-going output is experienced from gate SG2 when all inputs are negative and this output when inverted is used to set toggle TSS (the store selection toggle) and toggle TPOD (the pre-operate disturb pulse toggle), to drive delay line DLF (which is a 0.2 μsec. delay line used for fault signalling) via its associated input inverter and to "strobe" the address data input and gates AG1, AG2, . . . LG1 and LG2 in FIG. 5. The address data input AND gates are fed with the normal and inverted address information over leads N1 to N12 and I1 to I12 respectively. For clarity only inputs N1, N7 and N12 together with their complements I1, I7 and I12 are shown and these inputs are fed to associated control and toggle circuits which are individual to each bit of the address word. Toggle TA1 is the toggle for bit one of the address word while toggle TA12 is the toggle for the last bit of the address word. To prevent confusion toggles TA2 to TA11 are not shown in the drawings, however, these toggles are controlled in an identical manner to toggles TA1 and TA12. As mentioned previously each three bit subsection of the address word forms a selector code as follows; subsection 1 (bits 1–3, leads N1–3) X left selector, subsection 2 (bits 4–6, leads N4–6) X right selector, subsection 3 (bits 7–9 leads N7–9) Y lower selector and subsection 4 (bits 10–12 leads N10–12) Y upper selector. The address word is presented in both normal and inverse form allowing a relatively simple checking circuit to be employed for each address toggle. The checking circuit shown for toggle TA1 will be described, it being realised that all address toggles (TA2–12) have similar circuit arrangements.

Assuming that a "1" is present in the first bit of address word subsection 1, then lead N1 will be at −6 volts and lead I1 will be at 0 volts. The signals on leads N1 and I1 are gated by the output of gate SG2, via two inverters in series, and in this case a negative output will be produced from AND gate AG1 when the store is selected. AND gate AG2 will produce a positive output (i.e., 0 volts) due to lead I1. The output from gate AG1 is inverted, by inverter AIV1, and applied to AND gate AG4 directly and to AND gate AG3 via inverter AIV3. The output (0 volts in the assumed case) from AND gate AG2 is inverted and applied to toggle TA1 which will remain reset (i.e., the input address word is stored in the address unit in inverted form). The outputs from toggle TA1, which are 0 volts set ("1") side and −6 volts reset ("0") side, are applied to gates AG3 and AG4 respectively thus the outputs from both these gates will be positive (0 volts) indicating a valid condition. The output from these two gates are commoned with the corresponding pair of gates for each of the other two bits in the subsection. The AND gates AG3 and AG4 used are of the type provided with an OR gate diode in the output so that the commoning of the six gates used for each subsection forms a six bit negative OR gate input to inverter CAI1. It is arranged that the outputs from gates AG3 and AG4 will be positive (0 volts) if the stored bit on toggle TA1 correctly compares with the input address bit and, therefore, the condition of the input to inverter CAI1 will be indicative of the check performed on each bit of a subsection. The same check is provided for each subsection and the check result for the X right selector code (subsection 2) is presented via inverter CAI2 to the input of inverter XC1 together with the output from inverter CAI1. The input to inverter XC1 will be negative (−6 volts) if both X left and right selector codes have been correctly stored and, therefore, toggle TXC will be set to record this fact. The same arrangement is provided for checking the validity of the conditions of toggles TA7 to TA12 which are used to store the Y lower and upper selector codes the result being indicated by the condition of toggle TYC. When all the address bits have been correctly stored the set outputs from toggles TXC and TYC are applied to AND gate ASUG which, via inverter ASUI, produces the "address setup" signal to the controlling computer over lead ASU.

The checking circuit described above, when a fault in the registering of the address word is experienced, is used to gate the fault signal pulse generated by delay line DLF to set the fault toggle TFA. Assuming that the most significant bit of the X left selector word is a "0" and toggle TA1 remains reset then the conditions presented to gates AG3 and AG4 will be, 0 volts from AIV3 and 0 volts from TAI (set side) and −6 volts from AIV1 and −6 volts from TAI (reset side). Thus the input to inverter CAI1 will be negative causing toggle TXC to remain reset. The output from toggle TXC (reset side) opens gate FAG1 allowing the negative delayed output pulse from delay line DLF to set toggle TFA via inverter IFA. Gate FAG2 is used to set toggle TFA if a fault is found in the registration of the Y selector codes. The setting of toggle TFA indicates over lead FAU, to the controlling computer that a fault has occurred.

Two additional toggles are provided in the address unit associated with the address toggles TA1–12 and these two toggles TY1 and TY2 are used to store the value of the most significant bit of the X left selector code (received over leads N7 and I7). The value of this bit indicates which vertical half of the matrix is required and may, therefore, be used to select which inhibit wire I1 or I2 in FIG. 9 is to be used for the preoperate disturb pulse. Toggle TY1 is set if inhibit wire I1 is required (i.e., the required address employs magnetic cores in the right-hand vertical half of the matrix) and toggle TY1 is set if inhibit wire I2 is required. The outputs from the set sides of toggles TY1 and TY2 are individually gated with the positive (0 volts) output from gate SG1, suitably inverted, to produce inhibit wire select signals over the respective IWSL leads to select all the inhibit selectors (either IS1 or IS2 shown in FIG. 9) associated with the required inhibit wires. The inhibit selectors are positively driven linear gates and they are primed by the signals from toggles TY1 and TY2 for a duration defined by a delay line DLY in FIG. 5 which is associated with these toggles. This delay line, of 0.2 μsec. delay duration, is driven from a negative AND gate associated with the reset side outputs of toggles TY1 and TY2. The output from the delay line DLY is fed back to reset toggles TY1 and TY2. Thus after being set the particular Y toggle (either TY1 or 2) is reset 0.2 μsec. later by the delay line pulse.

It was mentioned previously that the output from gate SG2, via an inverter, was used to set toggle TPOD, the preoperate disturb toggle shown in FIG. 6. The set side output from this toggle is fed to all inhibit timing selectors, for example ITS for plane one of the store, controlling all the planes in the matrix. This allows the defined current, generated in the current definer CD associated with the selected inhibit selector (either IS1 or IS2), to pass through the half planes selected to the positive supply +VS associated with all the inhibit timing selectors such as ITS (FIG. 9). The inhibit timing selector is held operated for a duration defined by the delay line DPD and this is arranged to be 0.15 μsec. Toggle TPOD is, therefore, reset 0.15 μsec. after being set by the output from DPD via inverting amplifier APD.

Store word selection

The various selector units are shown in the lower portion of FIGS. 5 and 6 and in FIGS. 8 and 9 and they are designated as follows: XLS the X left selector unit, which includes the primary selector: WXP1–8 for a write operation together with the secondary selectors RXS1–8 and the timing selector RXT1 for a read operation; XRS the X right selector unit, which includes the secondary selectors WXS1–8 and timing selector WXT for a write operation together with the primary selectors RXP1–8 for a read operation; YLS the Y lower selector unit, which includes the primary selectors WYP1–8 for a write operation together with secondary selectors RYS1–8 and timing selector RYT for a read operation; and YUS the Y upper selector unit, which includes the secondary selectors WYS1–8 and the timing selectors WYT1–8 for a write operation together with the primary selectors RYP1–8 for a read operation.

Selection is carried on by means of binary to linear decoding circuits. Since there are twenty-four available address outputs from the address toggles TA1–TA12 and three address bits are required to define each selector, the decoder gates, for example DG1–8 in selector unit XLS, may be supplied with various combinations of toggle outputs to perform selection. These leads are shown in FIG. 2 as leads AL, and the particular toggle outputs are shown in FIG. 8. There are a total of eight decoder gates for each selector and, as the address is stored in inverse form, the following is a typical example for the selection of the X (write primary/read secondary) selectors. The decoder gates are negative AND gates and therefore the following table shows the conditions of the address toggles (i.e., TA1=toggle TA1 set and $\overline{TA1}$=toggle TA1 reset) required for selection.

| Decoder gate inputs: | Selectors to be used in XLS |
|---|---|
| TA1, TA2, TA3 | WXP1 (write); RXS1 (read). |
| $\overline{TA1}$, TA2, TA3 | WXP2 (write); RXS2 (read). |
| TA1, $\overline{TA2}$, TA3 | WXP3 (write); RXS3 (read). |
| $\overline{TA1}$, $\overline{TA2}$, TA3 | WXP4 (write); RXS4 (read). |
| TA1, TA2, $\overline{TA3}$ | WXP5 (write); RXS5 (read). |
| $\overline{TA1}$, TA2, $\overline{TA3}$ | WXP6 (write); RXS6 (read). |
| TA1, $\overline{TA2}$, $\overline{TA3}$ | WXP7 (write); RXS7 (read). |
| $\overline{TA1}$, $\overline{TA2}$, $\overline{TA3}$ | WXP8 (write); RXS8 (read). |

Each of the decoder gates is a four input AND gate, the fourth input being a control input derived from the address set-up signal. This control signal ensures that when the address toggles are reset after the store has been used the eighth decoder gate in each selector is not permanently selected. When the required decoder gate is selected the outputs from all the eight decoder gates after inversion are applied to a linear fault detector circuit, for example LFDPX in selector XLS, together with their inverse conditions (by means of a further inverter). The linear fault detector circuit ensures that one and only one decoder gate has been opened by the address toggles and the address set up signal, by comparing the normal and inverse octal codes effectively formed by the conditions of the two separate sets of eight input leads.

The output from the selected decoder gate is applied (after the two stages of inversion required for the linear fault detector circuit) to two gates of two sets of eight gates. These gates, for example WG8 and RG8, are controlled by signals from the write selector and read select toggles TWS and TRS respectively in the address unit AU. These signals are in fact taken from the reset side of toggles TWS and TRS and fed via inverters to gate control leads XPW and XSR.

The initial operation outlined above is almost the same for each operation of the store and, therefore, the following sections dealing with the actual store operation required will only point out the changes, if any, in the functioning of the address unit AU and the selector unit SU for each operation. The time relationship between various input signals and toggle operations may be seen with reference to FIG. 4.

The various waveforms shown in FIG. 4 which portray the operation of the equipment so far are as follows.

SA and SS indicates the address and store selection inputs.

R, R/R, SA indicates the presence of read, read/rewrite or set address signals.

TA1–12 indicates the setting of the required address toggles in accordance with the address input data.

TMY/1 indicates the setting of the Y address most significant bit toggles,

TY1 and TY2 is required.

TPOD/1 indicates the setting of the preoperate disturb pulse toggle TPOD.

PODOP indicates the preoperate disturb pulse output at the inhibit wire timing selector ITS.

Before proceeding with the operation of the selectors, consideration will be given to the operation of the fault toggles TDF1–4 FIG. 8 which are operated if a fault condition is produced by any of the linear fault detectors LFDPX, LFDSX, LFDPY and LFDSY. The negative-going edge generated by the operation of the address set-up toggles TXC and TYC is applied to a delay line DFA via two inverters (FIG. 8). The output from each linear fault detector is fed after inversion to a three input AND gate, such as FA1 for LFDPX, which is also fed with the inverted output from DFA and the inverted output from the reset side "0" of toggles TSS. Thus, if a fault occurs in the selector decoders (i.e., no decoder gates or more than one opened) the positive output from the relevant one of gates FA1–4 after inversion (not shown) sets the associated fault toggle TDF1–4. The setting of one of these toggles produces a fault indication on one of four leads AL to the controlling computer.

Read cycle

The delay line DPD governing the preoperation disturb pulse has a further tap, the output from which, after amplification and inversion, is applied via an inverter to a three input AND gate RCG shown in FIG. 6. The set output from toggle TSS (store selection toggle) in FIG. 6 is also applied to this gate together with the inverted output from positive OR gate SG3. A negative condition will be presented to gate RCG from gate SG3, after inversion, when a store operation condition of read or read/rewrite is required indicated by a 0 volts condition on leads R or R/R. Thus, when this condition arises, toggle TRS, the read select toggle, is set by the inverted output from negative AND gate RCG.

The outputs from the read select toggle TRS, are taken to the selector units to control the decoder gate outputs as stated above. The set output from toggle TRS is also used to control the read timing selectors by means of lead TRS1 in FIG. 8. The set output of toggle TRS is also used to control the input gates to the delay line DRS (FIG. 10) which controls the read synchronisation toggle TSR as well as starting the timing control circuit at timing control gate TCG2 (FIG. 10). The outputs FPX, FPY, FSY and FSX from the fault detection circuits LFDPX, LFDPY, LFDSY and LFDSX respectively are normally negative (i.e., no fault detected) hence when toggle TRS is set, gate TCG2 is opened and a positive (0 volts) condition is presented to input gate TCG3 for the timing control toggle TCT, and thereby allowing toggle TCT to be set. The −6 volts set output from this toggle TCT is presented to all the timing selector control gates TSG1–4 (one in each selector unit shown in FIGS. 8 and 9). Only those timing control gates TSG1 and TSG2 fed with signal TRS1 (derived from the set condition of toggle TRS) are opened and the inverted output from these gates is used to operate the associated timing selector.

Assume now that the required address is of the following form:

| Sections | 1 | | | 2 | | | 3 | | | 4 | | |
|---|---|---|---|---|---|---|---|---|---|---|---|---|
| I/P on leads N1–12 | 0 | 0 | 0 | 1 | 1 | 1 | 1 | 1 | 1 | 0 | 0 | 0 |
| Condition of Address Toggles | TA1 | TA2 | TA3 | $\overline{TA4}$ | $\overline{TA5}$ | $\overline{TA6}$ | $\overline{TA7}$ | $\overline{TA8}$ | $\overline{TA9}$ | TA10 | TA11 | TA12 |

The above table indicates that, for a reading operation, the core on each plane which is required is defined by primary selector 8 and secondary selector 1 for the X axis and primary selector 1 and secondary selector 8 for the Y axis. Thus the following current paths from the current definers will be completed by the operation of the timing selectors:

X wire.—Current from current definer CD via selector RXP8 and associated diode to all X core lines 57 to 64, from X core line 57 via associated diode and selectors RXS1 and RXT to the +VS supply.

Y wire.—Current from current definer CD via selector RYP1 and associated diode to all Y core lines 1–8, from Y core line 8 via associated diode and selectors RYS8 and RYT to the +VS supply.

Hence it may be seen that the input address has selected the core at the intersection of X core line 57 and Y core line 8.

Figure 8:
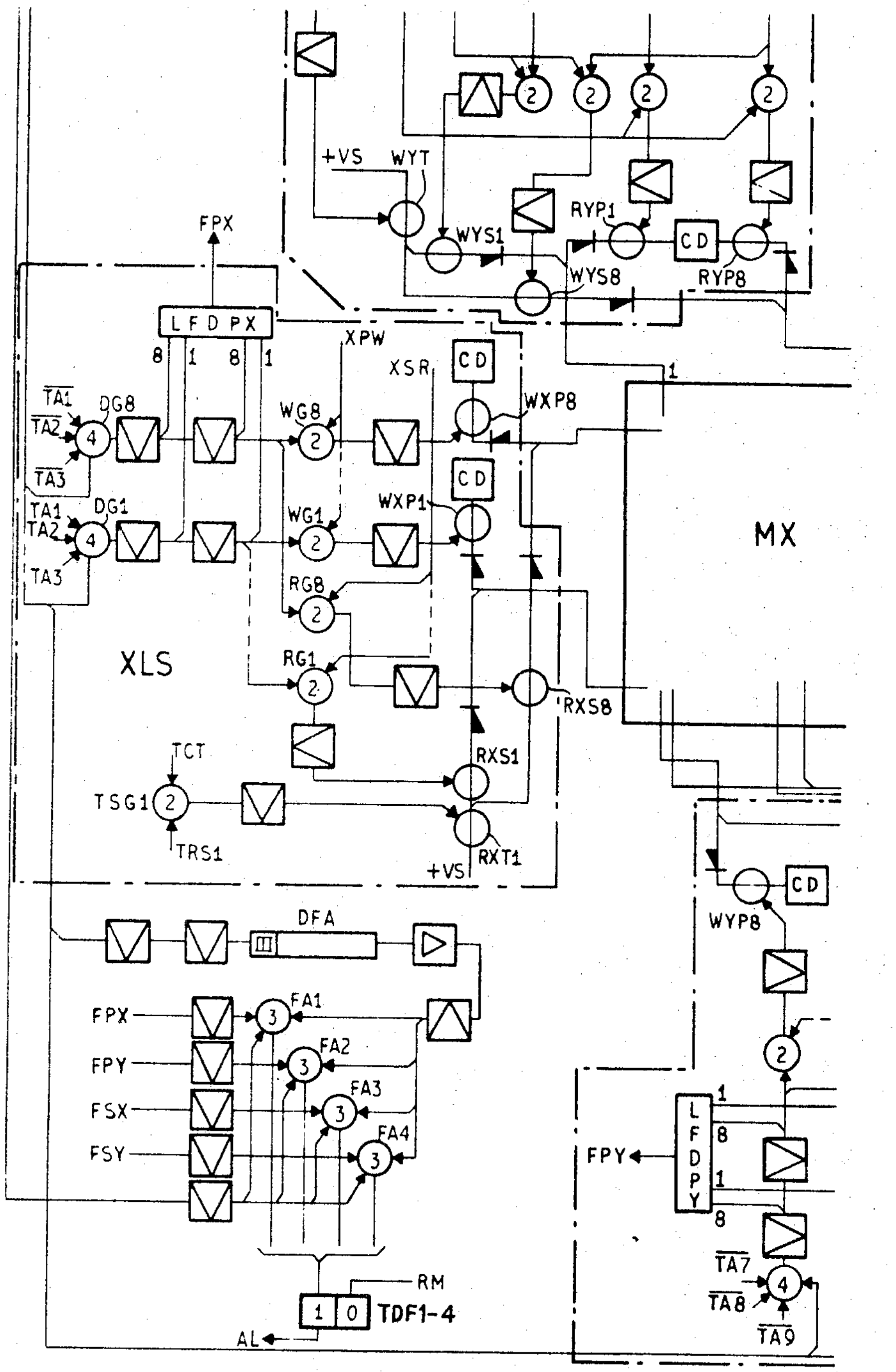

The duration of the selection half current pulse is defined by the length of time the timing selectors, selectors RXT and RYT in FIG. 8 in the above case, are operated and this is in turn dependent upon the length of time toggle TCT is set.

The reset side of toggle TCT (FIG. 10), the timing control toggle, is fed to a delay line DTC1. This delay line has two output taps one of which, the output providing the shortest delay, is fed after amplification and inversion via an inverter, to all the read synchronisation circuit input gates RSG of which there are seven, one for each of two subsections for the output word. The second output from delay line DTC1 is fed via an inverting amplifier and an inverter to a further delay line DTC2 whose output is used to reset toggle TWTC, which is used only on a write cycle, and after amplification and inversion to drive a third delay line DTC3 having two output taps.

The "early" output from delay line DTC1 which feeds all the read synchronisation circuit input gates, such as RSG (FIG. 10) is gated at this negative AND gate by the set output from toggle TRS, the read select toggle. There are seven such RSG gates and each gate feeds, via two inverters, two read synchronisation delay lines DRS (i.e., fourteen such delay lines in all, one for each subsection for the output word). Each delay line has two separate output taps which are used to control the setting and resetting of the associated read sync. toggle TSR. The first positive output from delay line DRS sets toggle TSR and the later output, arranged to be 0.1 μsec. removed from the first output, resets this toggle.

The set output from toggle TSR is presented to two AND gates SSG1 and SSG2. These gates are used to define which of the two sense wires S1 or S2 (FIG. 7) will be used to read the output signal. The sense wire for each plane, as mentioned previously, is split into two sections each section serving half the plane parallel to the X drive wires and threading diagonally opposite quarters of the plane in series. Each sense wire is read separately by the output amplifier the choice being made by using the most significant X and Y address bits. A most significant X bit=1 and a most significant Y bit=1 or most significant X bit=0 and a most significant Y bit=0 will designate diagonally opposite quarters of the plane and in fact will designate the bottom right and top left quarters respectively of the plane, thus selecting sense wire S1. A most significant X bit=1 and Y bit=0 or X bit=0 and Y bit=1 will designate the top right and bottom left quarters respectively of the plane, thus selecting sense wire S2. The choice of the required SSG1 or SSG2 gate is performed by lead SWSL. When the most significant X bit=1 and the most significant Y bit=1, a negative output from gate QSG1, FIG. 5, is experienced due to the fact that toggles TA1 and TA7 will both be reset. When the most significant Y bit=0 and the most significant X bit=0, a negative output is produced from gate QSG2, FIG. 5. The output from both these gates is fed into an inverter forming a two input negative OR gate (by means of gate output diodes) thus a negative output from one of these gates is inverted and applied to lead SWSL where it is again inverted and applied to the fourteen sets of gates SSG1. This SWSL lead is also applied to gates SSG2 (FIG. 10) after further inversion thus allowing gates SSG2 to operate when the outputs from both gates QSG1 and QSG2 in the address unit AU (FIG. 5) are positive (i.e., most significant X bit=0 and most significant Y bit=1 or most significant X and Y bits=1 and 0 respectively). As mentioned above toggle TSR (FIG. 10) is set for 0.1 μsec. and therefore the selected gate (either SSG1 or SSG2) is opened for 0.1 μsec.

This 0.1 μsec. synchronisation pulse is inverted and applied to a positive OR gate or DCIG in the output unit OU (FIG. 10) which controls the rewrite data check circuit delay line DDC. The positive synchronisation pulse after inversion is applied to four input strobe gates, such as ASG1, serving four separate read amplifiers. As stated previously there are fourteen read synchronisation toggles therefore a total of fourteen subsections of the output word is controlled by these toggles (each toggle serves four amplifiers forming one subsection). The output word register, therefore, consists of twelve subsections (i.e., 48 bits) plus two spare subsections. Each read amplifier such as RA1 controls one output toggle in the output register, for example, read amplifier RA1 is shown feeding the set side of output toggle TO1. Fifty-six such read amplifier and output toggles are provided. An output pulse on the selected sense wire is experienced when the selected core has been storing a "1" and this pulse is strobed at gate ASG1 or ASG2 to allow amplifier RA1 to set toggle TO1.

Figure 7:
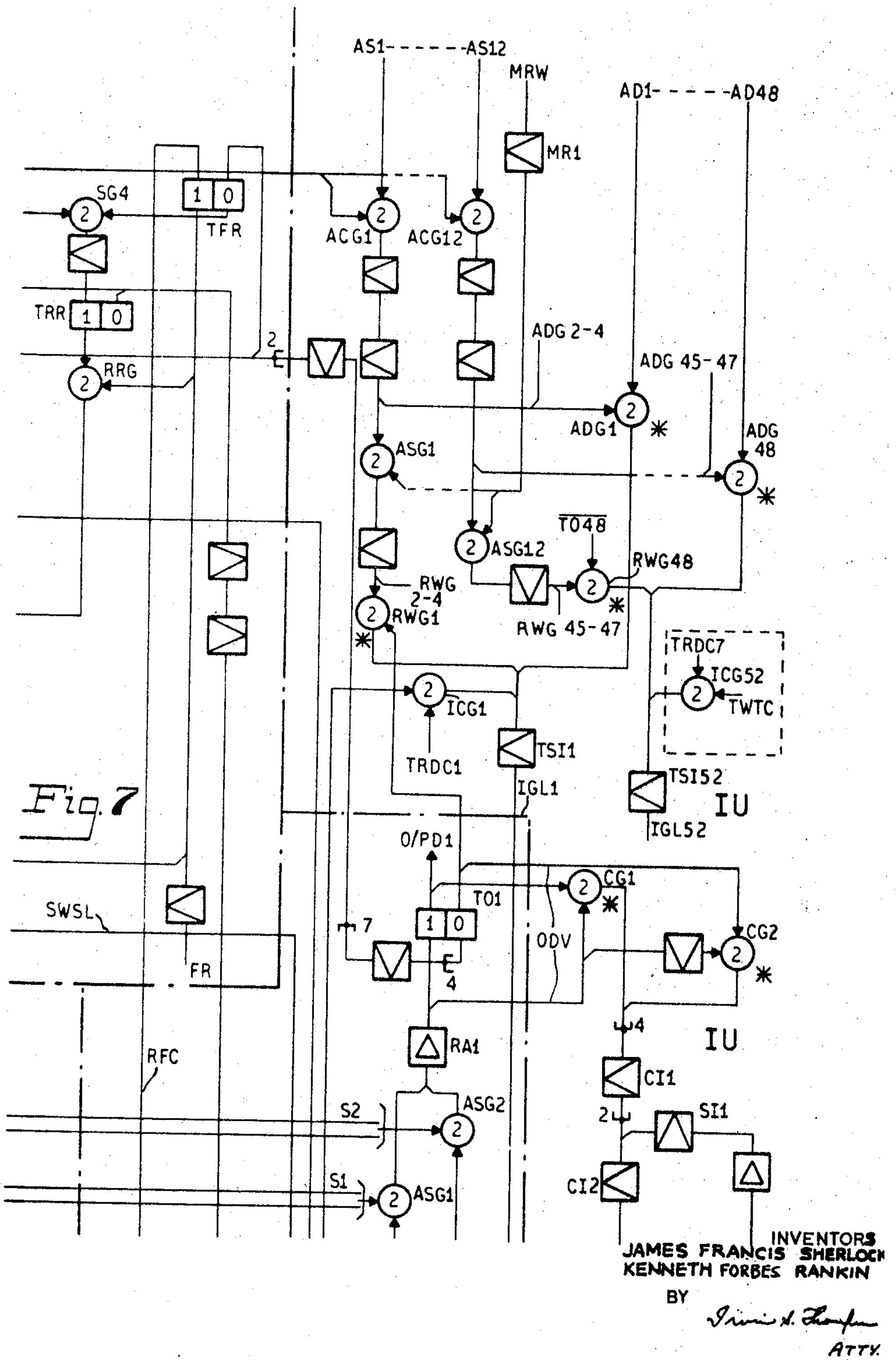

At this time toggle TFR, the read finish toggle in FIG. 7 is set by the output from the timing control circuit by delay line DTC3. A short time later this delay line resets the timing control toggle TCT. When toggle TFR is set an output signal FR is produced which indicates the completion of the read only operation to the controlling computer. Assuming a read operation is required the only item remaining is to check that the output data presented on leads O/PD1 to O/PD48 is correct.

The output data checking circuit checks the output of the read amplifier, for example RA1, against the output of the output data register toggles, for example TO1. The two outputs from toggle TO1 together with the normal and inverted ouput from read amplifier RA1 are applied to a coincidence circuit the input gates of which are CG1 and CG2 in FIG. 7.

Under normal or non-fault conditions, the two negative AND gates CG1 and CG2 will be closed and they will therefore present a 0 volt condition to inverter CI1. Two gates such as CG1 and CG2 are provided for each output toggle and the four circuits in each subsection are commoned together at the input to inverter CI1 so that a total of fourteen inverters CI1 will be provided (i.e., one for each subsection). To prevent transient conditions erroneously causing the operation of the fault indicating toggle TDCF, the checking circuit is strobed by the delayed read synchronisation pulse. This synchronisation pulse, as stated previously, is applied to delay line DDC, after inversion, by positive OR gate DCIG. This delay line DDC has two outputs and the first in time is applied via an inverting amplifier and an inverter SI1 to the input of inverter CI2 together with the output from two inverters CI1 (i.e., the outputs from eight AND gates such as CG1 and CG2 are served by one inverter CI1). A total of seven inverters CI1 are provided, one serving two subsections. Therefore, before the first positive-going strobe pulse from DDC is experienced the input to inverter CI2 is held at 0 volt by inverter SI1 regardless of the conditions of two inverters CI1 which feed inverter CI2. When the strobe pulse is produced by delay line DDC this positive-going pulse is effective in switching inverter SI1 such that its output becomes −6 volts. Inverter CI2 will switch assuming the condition of toggle TO1 is correct and the positive-going pulse thus produced by CI2 sets toggle TRDC1 indicating the correct condition is stored on toggle TO1. There are seven such toggles TRDC1–7 in all, one for each pair of subsections.

Assuming now that toggle TO1 is not in the required condition, either gate CG1 (toggle set, "0" condition read from store) or gate CG2 (toggle reset, "1" condition read from store) will be open. These gates together with the two corresponding gates for each bit of the subsection are of the type having an output (OR) diode and hence an eight-input negative OR gate is formed at the input to inverter CI1. The output from inverter CI1 will, therefore, be 0 volt. As mentioned previously the output condition from inverter SI1 is 0 volt until the first strobe pulse from delay line DDC and, therefore, the output condition from inverter CI2 is −6 volts. When the strobe pulse occurs no change in condition is apparent to inverter CI2 due to the 0 volt output from inverter CI2. Toggle TRDC1, therefore, remains reset. When the second strobe output from delay line DDC occurs, the 0.1 μsec. pulse is amplified and then inverted, by inverter SI2, before being presented to negative AND gate DCFG. This gate is opened by this pulse, as toggle TRDC1 is reset, and the data check fault toggle TDCF is set producing a fault indicating signal over lead FOU to the controlling computer.

The read operation is complete when the output data check is finished and this fact is indicated by the signal on lead FR from the set read finish toggle TFR. The output from this toggle TFR also resets toggle TRS, the read selection toggle. The store now remains in this state with all the address toggles in their original conditions, the store selection toggle TSS set and all the cores in the selected word in the "0" state. No further action takes place until a subsequent "write" signal on lead W is received.

The various signals generated above in the read only cycle may be considered with respect to time with reference to FIG. 4. These waveforms indicate certain operation as follows:

(X&YWS) R indicates the operatio nof the X and Y wire primary and secondary selectors gates such as RXP8, RXS1, RYP1 and RYS8. X&YTS indicates the operation of the X and Y wire timing selectors RXT and RYT.

RS@ RA indicates the read synchronisation at the input gates to the read amplifiers.

TO1–48 indicates the setting of the output toggles, such as TO1 shown in FIG. 7, to the output data read from the store and in fact will be the waveform experienced on the output lead when a "1" is read from store.

TODC indicates the output data correct toggle "1" side output waveform.

Read/rewrite cycle

For a read cycle to be followed immediately by a rewrite cycle, an 0 volt signal must be applied by the controlling computer to lead R/R (FIG. 6) instead of lead R and a −6 volts condition to lead MRW. The R/R signal together with the store selection signals allows the setting of the store selection toggle TSS which resets toggle TFR and, after the preoperate disturb pulse, sets the read select toggle TRS, as mentioned for the read only cycle. The read select toggle TRS biases the read gates, for example RG1–8, controlling both X and Y selectors (primary and secondary) for a period slightly in excess of the duration of the read drive pulse from the timing selectors as can be seen in FIG. 4 waveforms (X&YWS)R and X&YST respectively. The read drive pulse timing, controlled by delay lines DTC1–3 in FIG. 10, is initiated by the read select toggle TRS in conjunction with the decoder linear fault detector outputs. At the end of the "read drive" pulse the read finish toggle TRF is set causing the read select toggle TRS to be reset. All these operations are as detailed above for the read only cycle.

The read/rewrite signal (0 volts condition) on lead R/R allows the read/rewrite toggle TRR in FIG. 7 to be set as negative AND gate SG4 is opened by the inverted signal on lead R/R together with the reset output from toggle TFR.

When toggle TFR is set, to indicate that the read operation is complete, toggle TWS is set by the inverted output of negative AND gate RRG which is opened by toggle TRR set and toggle TFR set. The setting of toggle TWS allows the setting of the write timing control toggle TWTC (FIG. 10) as negative AND gate TCG1 is opened by the negative outputs from all the linear fault detectors, indicating correct selection of the X and Y wires, together with the set condition from the seven rewrite data correct toggles TRDC1, indicating that the output data stored on toggles TO1–48 corresponds to the information read from the magnetic core matrix store.

The positive output from the "0" side of toggle TWTC is fed to all the control circuits for the inhibit timing selector leads IGL1–52 (only IGL1 and IGL52 are shown in FIG. 7) together with the "1" outputs from all the rewrite data correct toggles TRDC1–7. These signals are applied to 52 separate negative AND gates ICG1–52 (only ICG1 and ICG52 are shown in FIG. 7) and these gates are used to control the operation of the inhibit timing selectors, when required, when the rewrite or write cycles take place.

Considering now in detail the operation of the inhibit timing selector control circuit associated with bit one of the store word and, therefore, the rewriting into the store of the condition of toggle TO1, each inhibit timing selector control circuit for all output toggles is identical to that shown for toggle TO1. As mentioned previously when a read/rewrite operation is required lead MRW is biased to −6 volts by the controlling computer. AND gate ASG1, therefore, is closed by the 0 volts output from inverter MR1 and the inverted output from this gate is applied to AND gate RWG1, the rewrite control gate. The other input to gate RWG1 is from the "0" side of the output toggle TO1. Gate RWG1 is of the type having an output OR diode while gate ICG1 is of the type consisting of two diodes, one for each input, and is usually referred to as a clamping gate. The diodes in gate ICG1 are so poled that they will clamp the output of gate RWG1 at 0 volts if either input to gate ICG1 is positive. As mentioned previously gate ICG1 is opened when the write cycle of the read/rewrite operation is commenced provided the output data stored on the output toggles has been checked and found correct, gate ICG1 being opened for a duration defined by the duration of the set condition of toggle TWTC (FIG. 10). Assuming that these conditions are satisfied, gate ICG1 will be opened and the input to inverter TSI1 is controlled by the rewrite control gate RWG1.

At this time the pulse fed to the write timing delay line DWT (FIG. 10) will, after amplification, close negative AND gate TCG3 producing a positive-going edge which sets toggle TCT, the timing control toggle. The setting of this toggle allows the operation of the timing selectors, under the control of gates TSG3 and 4, associated with the required write X and Y primary selectors. These selectors have been previously defined by the address output conditions connected as inputs to the decoder gates in selector unit SU and the setting of the write select toggle. The functioning of the control circuits for the primary and secondary selectors is the same as that described for the read operation except that the write gates, for example gates WG1 to WG8 (FIG. 8), are used instead of the read gates, for example, RG1 to RG8 due to the presence of a −6 volts condition on lead XPW taken from the write selection toggle TWS. As the write gates are opened, not the read gates as described previously, the core selection pulses are driven through the selected cores in the opposite direction to that used for reading. As a rewrite operation is being performed the address used is the same as stated for the read only operation and therefore the following selectors will be operated.

X wire.—Current from current definer CD via selector WXP1 and associated diode to all X core lines 57 to 64, from X core line 57 via associated diode and selectors WXS8 and WXT to the +VS supply.

Y wire.—Current from current definer CD via selector WYP8 and associated diode to all Y core lines 1–8, from Y core line 8 via associated diode and selectors WYS1 and WYT to the +VS supply.

Prior to the operation of toggle TCT (FIG. 10), which operates the timing selectors, toggle TWTC "opened" the inhibit control circuit at gate ICG1 (FIG. 7). If toggle TO1 is set (i.e., toggle stores a "1" condition), the rewrite gate RWG1 is not opened and inverter TSI1 holds the inhibit gate lead IGL1, which feeds the inhibit timing selector ITS, at −6 volts. However, if toggle TO1 is reset (i.e., toggle TO1 is storing a "0" condition) the rewrite circuit must arrange to inhibit the required core as the half current selection pulses cause the core to switch from the "0" state, after read, to a "1" state automatically. As stated previously, each inhibit wire accommodates half the plane and is threaded in opposition to the X drive wires. The same selection of inhibit wire as described for the preoperated disturb pulse holds for the write operation.

When it is sensed that toggle TO1 is reset, gate RWG1 is opened and the condition on lead IGL1 becomes positive for the duration of the "open" condition of gate ICG1. This condition closes gate ITG1 allowing timing selector ITS (FIG. 7) to operate and pass a current defined by a current definer associated with the inhibit selector IS1 or IS2 and determined by the most significant bit of the Y primary selector. The duration of this inhibit pulse is defined by the duration of the set condition from toggle TWTC.

Toggle TWTC is reset by the amplified output pulse from delay line DTC2. The "1" side of toggle TWTC when this toggle is reset produces a write finish signal on lead WF and causes toggle TWS to be reset, closing the X and Y wire timing selector control gates TSG3 and TSG4 in FIGS. 8 and 9 and, therefore, terminating the selection pulses on the X and Y wires. The output from the "1" side of toggle TWTC, when reset, causes toggle TRR (FIG. 7), the read/rewrite select toggle, toggle TSS (FIG. 6), the store selection toggle, toggles TXC and TYC (FIG. 5), the address set-up toggles, and the address toggles TA1–12 (FIG. 5), to be reset. After a further short delay, due to delay line DTC3, toggle TCT (FIG. 10) is reset and the store is ready for a subsequent operation. The signals read finish, lead FR, and write finish, lead WF, remain until the next time the store is taken into use. The output toggles TO1–48 also remain in the conditions read from the store in the last read operation and the rewrite data correct toggles TRDC1–7 remain set until toggle TSS is set at the start of a new read, read/rewrite or set address input signal to the store.

Referring again to FIG. 4, waveform (X&YWS) W shows the waveform experienced on a rewrite cycle at the X and Y wire selectors and waveform ITS that at the inihibit timing selector.

Write cycle

As mentioned previously all write operations must be preceded by a read operation to ensure security as far as the new store word is concerned. When a read only cycle is complete, the store is in the following condition: all cores of the selected store word are in the "0" condition, the word originally stored by these cores is stored on the output toggles and the rewrite data correct toggles are all set.

The same process for the write section of a read/rewrite operation is followed until the control of the inhibit timing selectors is required, except that the write select toggle TWS (FIG. 6) is effectively set by a positive (0 volts) signal on lead W which when inverted is gated with the "set" output condition from toggles TSS, the store selection toggle, at AND gate WCG. The negative-going output edge from gate WCG when this gate is opened, after inversion, sets toggle TWS. The setting of this toggle has the same effect as stated in the rewrite cycle causing the write gates to be opened in the selectors and starting the timing control cycle.

The output from the reset or "0" side of toggle TWTC, when this toggle is set, is fed as stated above to the inhibit write control gates, such as ICG1 shown in FIG. 7. These gates, clamping AND gates, are fed with the set outputs from toggles TRDC1–7 and are therefore all open for the duration of the set condition from toggle TWTC and are used to operate the inhibit timing selector if a "0" to be written in the selected core.

Provision is made for amending all or any of the subsections of the word and the subsections which are to be amended are indicated by a −6 volts condition on the relevant leads AS1–12, the amend subsection leads. This negative condtion, for example, if subsection 1 is to be amended, is gated, at AND gate ACG1, with the inverted write signal on lead W and, after two stages of inversion provided for power gain purposes, the output of this gate is applied to one input on each of the four amend data control gates ADG1–4, of which there are forty-eight in all four in a subsection and twelve subsections of amend data input. The output from gate ACG1 is also presented to an AND gate ASG1 which is also fed by the merge and rewrite control lead MRW. This gate is opened, as lead MRW for a write operation is at 0 volts, and it effectively closes the rewrite control gates RWG1–4 for subsection 1 thus preventing the conditions of the output toggles TO1–4 for subsection 1 from affecting the inhibit timing selectors. A similar arrangement is provided for each subsection and, therefore, if it is required to write a completely different word into store, all the amend subsection leads AS1–12 will be biased to −6 volts and, therefore, all the rewrite data control gates RWG1–48 will be closed.

The amend data which is to be written into the store is supplied in inverse form over leads AD1–48. For example lead AD1 will be biased to 0 volts when it is required to write a "1" and to −6 volts when it is required to write a "0."

When lead AD1, for example, is at 0 volts, gate ADG1 is held closed by this condition and the input to inverter TSI1 is held at 0 volts by the output OR diode provided in this gate. The inhibit timing selector therefore is not operated by toggle TWTC via gate ICG1 over lead IGL1, and the operation of the X and Y wire selectors causes the selected core to switch to its "1" state.

When lead AD1, for example, is at −6 volts, gate ADG1 is opened by this condition together with the output from the opened amend subsection control gate ACG1. This gate, when open, allows the pulse generated by toggle TWTC to open gate RCG1 and switch the input to inverter TSI1 for this duration. A positive pulse is, therefore, generated at the input of this inverter which is effective over lead IGL1, in operating the inhibit timing selector ITS in FIG. 9 to prevent the switching of the selected core from the "0" state to the "1" state therefore effectively writing a "0" at that bit of the store word.

At the end of the inhibit pulse toggle TWTC is reset closing the inhibit write control gates ICG1–ICG52 and producing a write finish signal on lead WF. The store remains in the condition detailed for the rewrite operation above.

An additional facility is provided in the store for merging "0's" and this facility is described below.

Merging "0's"

This is achieved by providing a −6 volt condition on the amend subsection leads AS1–12 and on the amend and rewrite lead MRW. Thus the rewrite control gates RWG1–48 are inoperative only when a coincidence of "1's" is experienced between the data stored on the relevant output toggle and the relevant one of the amend data leads AD1–48. In this way "0's" produced by either the amend data control gates ADG1–48 or the rewrite control gates RWG1–48 operate the associated digit selectors.

From the previous description it will be seen that as far as possible the functioning of the store is asynchronous and self-checking.

The fault indications which may be produced have been described as signalling to the controlling computer, however, they may be taken to fault-indicating unit external to the store and controlling computer. This fault-indicating unit may be used to produce a common fault arising in the store and may be located almost exactly with reference to this indicating unit. Thus a signal on, for example, one of the four leads AL (FIG. 8) will indicate which address decoder is at fault.

It has been mentioned previously that the core store may be driven in two stacks (i.e., two sections of 26 planes each). Certain arrangements for the current definer circuits may be made to save on the number of these circuits required and the boxes CD shown in FIGS. 5–10 are for explanatory purposes only.

Further alternative arrangements will readily be presented to those skilled in the art and the above description of one embodiment only is not intended to be in any way limiting to the invention.

We claim:

1. A magnetic core matrix data storage device comprising a plurality of groups of leads to which binary signals indicating the address of a required core are applied from external equipment, a plurality of groups of toggle circuits, each toggle circuit having a set and a reset output and each group of toggle circuits being associated with an individual group of said leads and activated in accordance with the binary signals on the associated leads, first checking means for checking that the setting of the groups of toggle circuits corresponds to the binary signals applied to said groups of leads, a plurality of binary to linear converters, each having a plurality of outputs, one binary to linear converter to each group of toggle circuits, means connecting the output of said first checking means to all said binary to linear converters, means connecting the set and reset outputs of each group of toggle circuits in different combinations to the binary to linear converter appropriate to each group of toggle circuits, each binary to linear converter responsive to the correct operation of said first checking means and to a particular combination of the set and reset outputs of the associated group of toggle circuits to select a particular one of said plurality of outlets, second checking means for each binary to linear converter for checking that one only of the outlets of the associated binary to linear converter has been activated, a plurality of X and Y primary and secondary selectors for core selection by coincident current single wire working and means responsive to the selection of one outlet by each of said binary to linear converters for activating an X primary selector, an X secondary selector, a Y primary selector and a Y secondary selector for selecting the required core.

2. A magnetic core matrix data storage device as claimed in claim 1, wherein said first checking means comprise a plurality of first checking circuits for individually checking each one of said group of toggle circuits and a second checking circuit which provides a single output for application as an enabling input to said binary to linear converters only on the correct operation of said first checking circuits.

3. A magnetic core matrix data storage device as claimed in claim 2 wherein each of said first checking circuits includes first and second two-input AND gates, means for applying in normal form a binary signal forming one digit of said address to the first input of said first AND gate, means for applying in inverse form the same binary signal to the first input of said second AND gate means for applying in normal form said binary digit to the set input of one toggle circuit of said groups of toggle circuits, means connecting the set and reset outputs of said toggle circuit to the second inputs of said first and second AND gates respectively, and means connecting the outputs of said gate circuits in an OR circuit.

References Cited

UNITED STATES PATENTS

| | | | |
|---|---|---|---|
| 3,045,209 | 7/1962 | Pomerene | 340—146.1 |
| 3,047,843 | 7/1962 | Katz et al. | 340—146.1 X |
| 3,049,692 | 8/1962 | Hunt | 340—146.1 |
| 3,229,251 | 1/1966 | Homan et al. | 340—146.1 |
| 3,329,940 | 7/1967 | Barnes et al. | 340—174 |
| 3,343,147 | 9/1967 | Ashwell | 340—174 |

OTHER REFERENCES

P. Cooke and D. C. Dillistone: "The Measurement and Reduction of Noise in Coincident-Current Core Memories," IEE paper No. 3957M, September 1962.

BERNARD KONICK, *Primary Examiner.*

JOSEPH F. BREIMAYER, *Assistant Examiner.*

U.S. Cl. X.R.

340—146.1, 172.5